United States Patent [19]
Cronkright, Jr. et al.

[11] 3,883,639
[45] May 13, 1975

[54] METHOD OF REMOVING SULFUR-CONTAINING GASES FROM WASTE GAS

[75] Inventors: Walter A. Cronkright, Jr., Somerville, N.J.; Bernard G. Mandelik, Houston, Tex.

[73] Assignee: Pullman Incorporated, Chicago, Ill.

[22] Filed: Dec. 21, 1972

[21] Appl. No.: 317,484

Related U.S. Application Data

[63] Continuation-in-part of Ser. No. 171,267, Aug. 12, 1971, abandoned.

[52] U.S. Cl. ............... 423/242; 423/166; 423/512
[51] Int. Cl. ............................................ C01b 17/00
[58] Field of Search ........................... 423/242–244, 423/166, 512

[56] References Cited
UNITED STATES PATENTS

| 2,086,379 | 7/1937 | Clark | 423/243 |
| 3,622,270 | 11/1971 | Shah | 423/242 |
| 3,632,306 | 1/1972 | Villiers-Fisher | 423/242 |

*Primary Examiner*—Earl C. Thomas
*Assistant Examiner*—Gregory A. Helby

[57] ABSTRACT

This process involves contacting a waste gas containing an oxide of sulfur with an aqueous medium having a pH below 7.1 in an autoregenerative cyclic process using limestone in combination with carbon dioxide, an added amount of a soluble sulfate of a cation such as potassium, lithium, sodium, magnesium or ammonium or mixtures of these compounds to remove the oxides of sulfur. The soluble sulfates may be added directly to the aqueous medium or may be formed in situ from the known carbonate, bicarbonate, oxide, sulfite, bisulfite, or hydroxide of these cations or ammonia after reaction with the sulfur oxides in the waste gas. Sulfur is removed from the cycle in the form of insoluble calcium sulfite and calcium sulfate.

10 Claims, 1 Drawing Figure

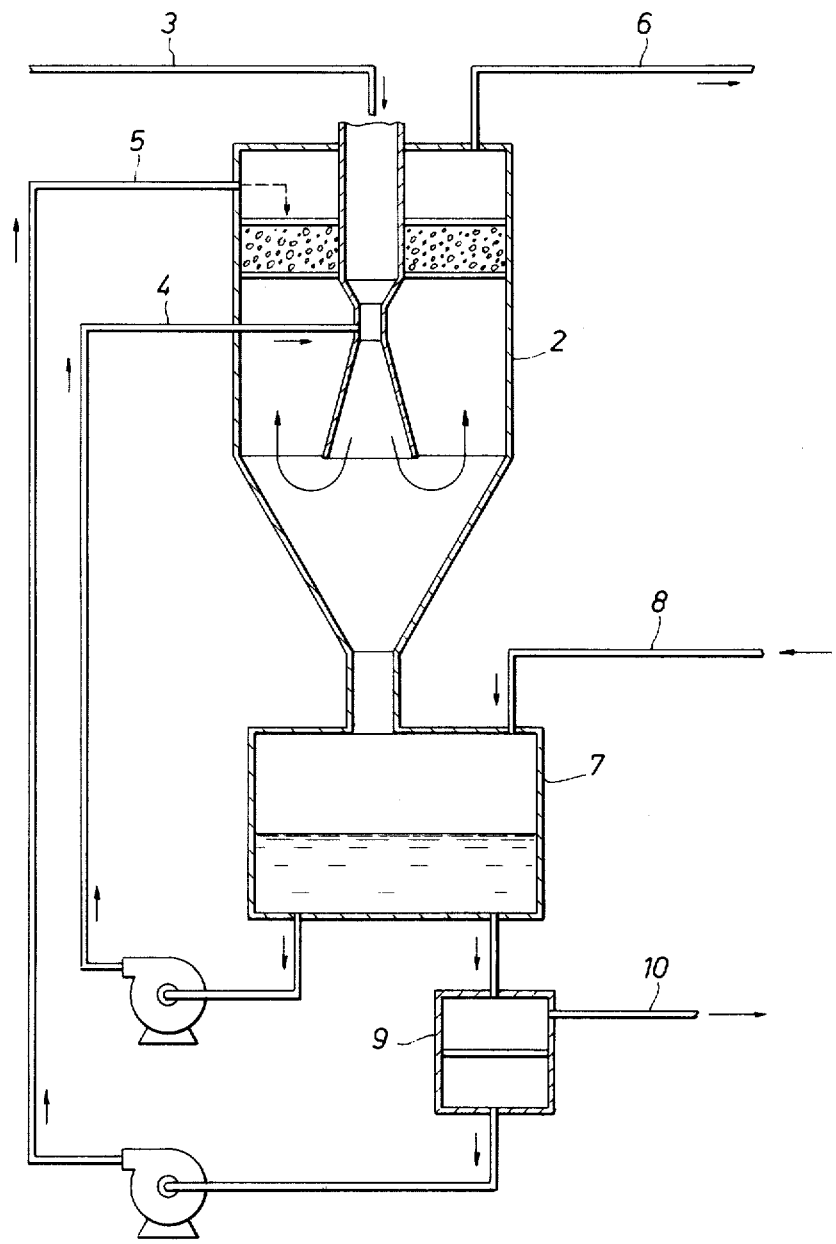

METHOD OF REMOVING SULFUR-CONTAINING GASES FROM WASTE GAS

This application is a continuation-in-part of pending application Ser. No. 171,267, filed Aug. 12, 1971 and now abandoned.

Oxides of sulfur such as sulfur dioxide and sulfur trioxide are components of many commercial effluents such as the effluent gas from coal fired electric power plants, flue gases such as boiler and furnace exhausts, smelter gases, off-gases from chemical and petroleum processes, stack gas produced from burning sulfur-containing hydrocarbon fuels, such as oil, sour natural gas and coal, gaseous effluents from the manufacture of sulfuric acid and other sources. Due to the noxious effect of these oxides of sulfur on human, animal and plant life and on metals and other materials, pollution of the atmosphere by these oxides has been a problem of serious concern and one of long standing. Notwithstanding the many proposals for the removal of these noxious gaseous components, none have proven satisfactory since they are highly inefficient and costly, involving significant losses of energy and inefficient use of the reacting species and process equipment. Because of the latter disadvantage it has been necessary to over-design equipment used in the processes currently being operated.

Limestone or dolomite injection into the boiler of a commercial power plant is presently one of the major commercialized sulfur removal processes in the United States. It has the advantages of the lowest capital investment and operating costs of any available developed process. However, dry limestone process tests to date have shown disappointingly low sulfur dioxide removal efficiencies which lead to the requirement for impractically large quantities of limestone to achieve desired levels of decontamination.

Of methods being considered for wide commercial application, the wet process, wherein the waste gases are scrubbed with an aqueous slurry is most attractive from the standpoint of inexpensive treating materials and has been shown to give improved efficiency. Aqueous solutions or slurries of lime, limestone, ammonia or organic liquids have been suitably employed in the removal of oxides of sulfur; although for reasons of economy, limestone or lime are most desirably employed. Other materials, being more expensive, would require reprocessing which adds to the overall capital requirement.

Limestone or lime slurries, however, are difficult and expensive to utilize because of their poor solubility in aqueous media. One method of minimizing this problem is to scrub sulfur dioxide from waste gases in a long residence time tower such as a packed column. Unfortunately, calcium sulfite and calcium sulfate precipitated from the scrubbing reactions deposit readily on packing and tower internals thereby necessitating frequent shutdown for cleaning operations. Many methods are known by which to minimize or remove these scale deposits, but the basic problem remains.

Another alternate in the use of limestone slurries is to utilize a scrubbing apparatus that has limited susceptability to scaling such as a Venturi-type scrubber or spray tower. Again, due to poor solubility of limestone in aqueous media, several short residence time scrubbers, in series, must be employed in order to remove sulfur dioxide to the degree required. Such systems have a high pressure drop and expans a great deal of energy in moving gas through the scrubbing system. In addition, large liquid to gas ratios are generally required thus adding increased auxiliary equipment cost to high scrubber cost.

Therefore, a method of removing sulfur dioxide from waste gases in a short residence time scrubbing system that utilizes a limestone slurry having substantially improved scrubbing capacity would reduce the overall size and cost of such systems and would thereby mark a significant advance in the art.

It is an object of this invention to overcome the present difficulties encountered in the removal of noxious oxides of sulfur from the commercial effluents mentioned above while improving the efficiency and economy of the wet process.

Another object of the present invention is to markedly increase the scrubbing capacity of the limestone washing medium.

Another object is to provide a process for the removal of sulfur values from low value sulfur-bearing waste gases.

Still another object is to effect about 95% removal of oxides of sulfur from waste gases.

Another object of the present invention is to provide a particular cyclic, autoregenerative process for the removal of sulfur dioxide from commercial waste gases.

These and other objects and advantages of this invention will become apparent from the accompanying description and disclosure.

In accordance with the teaching of this invention, a process is provided for the removal of oxides of sulfur from the commercial effluents or waste gases described above, the method including a liquid phase process comprising scrubbing waste gas containing oxides of sulfur in a contacting zone with an aquueous medium having a pH below 7.1 containing calcium carbonate, carbon dioxide, and at least about 3 weight percent preferably between about 5 and about 27 weight percent of a soluble sulfate of sodium, lithium, potassium, magnesium or ammonia. The method further comprises formation of calcium sulfite and calcium sulfate in solid form which may be easily separated from the aqueous medium for disposal, further use, or subsequent recovery of sulfur values and the recycle of part of these solids, along with calcium carbonate to the waste gas contacting zone.

The scrubbing efficiency of an aqueous limestone slurry may be improved when such a slurry is promoted by small amounts of soluble sulfate, however, the improvement becomes pronounced as the level of soluble sulfate concentration is increased. There is no limit on the maximum amount of soluble sulfate which may be contained in the aqueous medium except that concentrations in excess of the saturation limit, about 40 weight percent depending on the choice of sulfate, will be lost from the process as solids. In the case of a magnesium sulfate promoted wet limestone process, the preferred concentration of soluble sulfate is from about 5 weight percent to about 27 weight percent.

The specific manner in which scrubbing efficiency of a limestone slurry is improved by promotion with a soluble sulfate is not known, however, the sulfate ion may reduce calcium ion cncentration thus freeing basic ions from their insoluble compounds. As a consequence of the increased dissolved scrubbing capacity casued by addition of a soluble sulfate it becomes possible to use the supernatent separated from spent slurry to remove additional sulfur dioxide from the gas. The total removal can thus exceed 95% of the sulfur dioxide in the waste gas without incurring the pressure drop penalties of multiple short-contact-time scrubbers or the plugging problems encountered when the total slurry is used in a packed tower.

Referring now to the drawings, a flowsheet of a preferred embodiment of the invention is presented in FIG. 1.

22,800 SCFM of waste gas at a temperature of 300°F and pressure of 15.1 psia. and having the following composition by volume:

| | |
|---|---|
| $SO_2$ | 1800 ppm. |
| $SO_3$ | trace |
| $O_2$ | 3% |
| $CO_2$ | 13% |
| $N_2$ & Argon | 70% |
| $H_2O$ | 14% | is introduced to the Venturi section of contacting zone 2 by means of waste gas line 3. Entering gas is contacted with 740 gpm. of aqueous medium from line 4 containing principally, by weight, 4.0 percent calcium sulfate, 5.0 percent calcium sulfite, 1.0 percent calcium carbonate, 12.7 percent magnesium sulfate, and entrained carbon dioxide.

Gas leaving the Venturi section then passes through a packed section of contacting zone 2 comprising a three feet deep bed of ceramic saddles where the gas is contacted countercurrently by 185 gpm. of an aqueous supernatent from line 5 containing principally 14 weight percent magnesium sulfate, and entrained carbon dioxide and is then passed to the atmosphere through line 6. Total gas-liquid contact time in the contacting zone is 0.5 seconds. Sulfur dioxide content of the waste gas is reduced to 180 ppm. (by volume) and the thus treated gas leaves the contacting zone at a temperature of 130°F.

The aqueous medium and aqueous supernatent streams are then combined and passed to make-up tank 7 where 12 pounds per minute of limestone are added from line 8. 740 gpm. of the resulting aqueous medium at a pH of about 5.4 are then recycled by way of line 4 to the contacting zone.

The remaining portion of the previously combined streams is passed to a separation zone 9 for removal through line 10 of 14 pounds per minute of precipitated solids which are predominantly calcium sulfite and calcium sulfate in addition to small amounts of calcium carbonate and other solids. 185 gpm. of the resulting aqueous supernatent is then returned by way of line 5 to the packed section of the contacting zone 2.

The soluble sulfate of the present invention can be introduced into the aqueous scrubbing media as a sulfate or mixture of sulfate salts to provide the concentrations given above. However, it is equally advantageous to generate the soluble sulfate *in situ* by adding to the aqueous solution or slurry a carbonate, bicarbonate, hydroxide, sulfite, bisulfite, or oxide, or mixtures thereof, of the corresponding cations ($Na^+$, $K^+$, $Li^+$, $Mg^{++}$, or $NH_4^+$). Such compounds include sodium carbonate, sodium bicarbonate, sodium hydroxide, sodium sulfite, sodium bisulfite, sodium oxide, potassium carbonate, potassium bicarbonate, potassium hydroxide, potassium sulfite, potassium bisulfite, potassium oxide, lithium carbonate, lithium bicarbonate, lithium hydroxide, lithium sulfite, lithium bisulfite, lithium oxide, magnesium carbonate, magnesium bicarbonate, magnesium hydroxide, magnesium sulfite, magnesium bisulfite, magnesium oxide, ammonium carbonate, ammonium bicarbonate, ammonium hydroxide, ammonium sulfite, ammonium bisulfite, ammonium oxide.

Under the usual conditions employed in the process, these sulfate generating comounds form the soluble sulfate of the corresponding cation. Generally and in accordance with the present teachings, the addition of the soluble sulfate, soluble sulfate generating compound or liquid ammonia is in an amount stoichiometrically equivalent to provide between a 0.3 and 5.0 molal solution with respect to soluble sulfate or up to the saturation limit of the soluble compound.

Solids content of the aqueous media is preferably maintained below 20 weight percent and preferably, at least 5 weight percent of these solids is calcium carbonate. Usually, when such solids accumulate to levels above 15% it is recommended, particularly in a cyclic operation, to pass the scrubbing liquid through a filter or to similarly treat the aqueous medium to remove at least a portion of the solids. It is to be understood, however, that the scrubbing liquid can be a clear solution which may be obtained from recovering the aqueous supernatent.

The waste gases treated by the process of this invention are those discussed in the introductory portion of this disclosure. These gases contain between about 0.03 and 20 weight percent sulfur in the form of oxides, acids and volatile salts and usually contain between about 50 and about 90 weight percent nitrogen and between about 0.1 and about 20 weight percent oxygen. When the gas is obtained from combustion sources, some solids such as fly ash and soot are also present in the gas. Since these solids and oxides of sulfur are most objectionable from the standpoint of health hazard, these components must be removed to levels below 500 ppm before the gas can be safely vented to the atmosphere. Although the process of the present invention permits removal of small amounts of sulfur dioxide (between about 0.01 and about 5 weight percent) from waste gases, it is not limited thereto and can be used to remove much larger concentrations from such gases as discussed above.

Generally, the present process comprises a series of treating stages including scrubbing, addition of calcium carbonate to the aqueous medium, precipitation of calcium sulfate and sulfite, and recycle of the aqueous medium. The limestone or calcium carbonate can be added to the circulating scrubbing liquid at any stage or between stages of the process but is preferably added after the scrubbing stage. The soluble sulfate or substance providing the cation of the soluble sulfate is added initially at any stage of the process. Since this material is recycled and regenerated in the cyclic system by precipitation of calcium sulfate and sulfite, there is no need for subsequent additions except as found necessary to make up normal losses.

The scrubbing step of the present process into which is introduced the untreated waste gas and the aqueous scrubbing medium containing solids may be carried out in one or a plurality of contacting zones and is preferably effected in a contacting zone having relatively short gas-liquid contact time, for example, a Venturi-type scrubber or spray tower. Representative gas-liquid contact times are generally less than three seconds and can be lower than 0.1 second.

When solids are removed from the aqueous medium to yield an aqueous supernatent, such aqueous supernatent may be separately introduced to one or more of the contacting zones in order to remove sulfur dioxide from the waste gas. The aqueous supernatent may be utilized with short or long gas-liquid contact times, for example, in packed or tray towers, spray towers, and Venturi-type scrubbers since solids accumulation on internal components of scrubbing equipment would not preclude their use.

Preferably, the aqueous supernatent is passed in countercurrent contact with waste gas in series with one or more gasliquid contact zones employing aqueous medium containing solids. One embodiment of this arrangement is depicted in the drawing as a combined contact zone provided with means for introduciton of aqueous medium containing solids to a Venturi section and separate means for introduction of aqueous supernatent to a packed section. In this manner, highly efficient sulfur dioxide removal may be attained.

Contacting of the gas and liquid phases proceeds at temperatures close to that of saturation of the gases, such temperatures are normally within the range of between about 100°F and about 180°F; under a pressure from 5 psia. to 50 psia., preferably from 12 psia. to 18 psia.

It is desirable that the liquid in the scrubbing zone have a pH between 4 and 7; however local acidic sites due to the formation of sulfurous acid may occur resulting in a lower pH. While pH controls solubility of components in the aqueous scrubbing media and is critical to the extent that extremes should be avoided, the pH range will normally be maintained within the stated range by operation of the process.

The limestone utilized in the process and added, for example, to the make-up tank, may or may not be previously calcined and other inexpensive sources of calcium carbonate, such as dolomite may be substituted in whole or in part for limestone at this stage of the process. Carbon dioxide may also be added to the liquid mixture during this stage of treatment so as to adjust the pH below 7.1 if necessary. In normal operation of the process, however, carbon dioxide will be entrained in the aqueous medium from contact with the waste gas stream and/or evolution of carbon dioxide from reaction of calcium carbonate in the aqueous medium thus obviating such addition.

The zone of limestone addition is maintained at a temperature substantially within the range employed in the contacting zone, and at a similar pressure, preferably at the same temperature and a pressure between 11 psia. and 25 psia.

The amount of calcium carbonate in the form of limestone or dolomite which is added to the aqueous medium is based on the amount of sulfur dioxide in the waste gas feed; however, a mole ratio between about 0.7:1 and about 2:1 is recommended for efficient operation in the process of this invention. Higher ratios formerly employed in the art without the presence of a soluble sulfate, can also be used if desired; although it is to be understood that such quantities of calcium carbonate are not required and, therefore, are merely wasted in the present process. For most efficient operation of the process, the molar relationship: soluble sulfate > calcium carbonate > sulfur dioxide, should be maintained in the contacting zone.

The solids in the slurry which are formed in the process by precipitation of the calcium sulfate and sulfite and any incidental fly ash, etc., removed from the gas are subjected to a separation treatment such as decantation, filtration or centrifuging or any other convenient method for separating solids from liquid. The resulting aqueous supernatent containing predominately water, soluble sulfate, entrained carbon dioxide, small amounts of bicarbonate, sulfite, and bisulfite ion, and small amounts of dissolved calcium carbonate is recycled and introduced to the contacting zone preferably separate from the introduction of the solids containing aqueous medium as previously described.

When decantation is selected as the method of separation, the settling time for solids to separate is usually not more than 2 hours. The solids so separated can be discarded or subjected to further well-known treatments for the recovery of sulfur containing materials as elemental sulfur or $SO_2$ or as sulfuric acid. These further and particular stages of recovery are not included in the present invention and are left to the preference of those employing the instant process.

The recovery of solids in the present process can be effected continuously or the solid sulfate and sulfite of calcium can be allowed to build up to a certain level in the circulating scrubbing liquid before removal of solids is effected. It is recommended, however, that the solids in the slurry not be permitted to exceed 20 percent by weight for efficient operation. By the process of this invention, substantially all of the sulfur oxides of the waste gas can be removed for discard or recovery.

Examples and illustrative embodiments of the process of the present invention will now be described.

EXAMPLE 1

Runs 1 through 37 are presented for purposes of comparison to show the capacity of scrubbing media for removal of sulfur dioxide from waste gases with and without the inclusion of a soluble sulfate in such media.

In each of the following runs, a simulated waste gas, containing about 3.0 volume percent oxygen; about 80 volume percent nitrogen and about 17 volume percent carbon dioxide in addition to varying amounts of sulfur dioxide as reported in Table I, is bubbled into the bottom of an elongated glass tube at a rate of about 1 liter per minute and through the liquid body of scrubbing medium contained in the tube at a temperature of 25°C under atmospheric pressure. Since the simulated waste gas contained no solids, the viscosity of the scrubbing liquid is easily controlled. The gas is contacted with the scrubbing liquid for about 0.3 second which is comparable to the desired contact time in commercial gas scrubbers, e.g., a scrubber of the Venturi type. The flow rate was selected such that 1 weight percent of the aqueous $CaCO_3$ slurry showed about 50% scrubbing capacity, i.e., utilization of the $CaCO_3$, when sulfur dioxide breakthrough was detected. Breakthrough is measured by passing the scrubbed gas through a conductivity cell which measures the sulfur dioxide in the scrubbed gas exiting from the treating zone. The data for each run includes a correction for the amount of $SO_2$ which would be removed by pure water or water containing solids other than $CaCO_3$ under the conditions of operation. The millimoles of $SO_2$ removed by water alone is subtracted from the net $SO_2$ absorbed due to components in the aqueous liquid to provide the value of "Net $SO_2$ absorbed" in the Table I.

At start up, the equipment is flushed with a mixture containing nitrogen, oxygen, carbon dioxide and sulfur dioxide, and the tubular glass scrubber is evacuated and then charged with the scrubbing liquid to be tested which, in most of the examples, is a slurry containing uniformly admixed calcium carbonate and water and may or may not contain the sodium or calcium salts mentioned above. The examples which contain no salt other than calcium carbonate are set forth for the purpose of a control run, on which comparison with scrubbing liquid containing the soluble sulfate can be based. The control runs simulate the limestone scrubbing slurries which have been used in known processes. About 100 ml. water are used to prepare the scrubbing liquid for each example.

The conductivity cell is filled with 50 ml. of a solution containing 0.003 molal $H_2O_2$ and 0.00002 molal $H_2SO_4$. All instruments of the cell are then standardized. In the conductivity cell any $SO_2$ gas in the scrubbed vapor is oxidized by the peroxide to form $H_2SO_4$. This procedure provides cummulative measurement of the $SO_2$ so that break-through is arbitrarily set at a total leakage of 0.025 millimoles of $SO_2$. Analysis of the feed gas for $SO_2$ is accomplished by absorbing a known volume of gas in 50 ml. of a more concentrated peroxide solution and titrating the formed sulfuric acid with sodium hydroxide.

In all experiments the total volume of gas passed through the scrubber at breakthrough is measured and from this total volume and from the feed analysis, the amount of $SO_2$ removed by the scrubbing operation is calculated.

In Table 1, runs 1 through 3 inclusive, show the effect of increasing the amount of $CaCO_3$ in the slurry from 0.6% to 1% and then to 10% by weight concentration. The scrubbing liquids of these examples are representative of those employed in commercial limestone scrubbing processes which use the wet method. The results establish that large amounts of solid limestone are not efficiently utilized in the scrubber but remain as undissolved solid particles and tend to accummulate until the desirable limit of the liquid viscosity prohibits further $CaCO_3$ addition. particularly, it is noted by comparing runs 1 through 3 that as the amount of limestone is increased, the efficiency of the $CaCO_3$ in the scrubbing liquid of these examples proportionately decreases.

Runs 6, 8, 9, 15, 18 and 31 show the effect of $CaSO_4.2H_2O$ and $CaSO_3.2H_2O$ addition to $CaCO_3$ in a slurry. It is seen that these solids, alone, have practically no effect on the scrubbing capacity of the liquid.

Runs 4, 5, 14 and 16, inclusive, illustrate the effect of employing sodium sulfate below the concentration limit of the invention, e.g., 1% with or without added $CaSO_4$ and $CaSO_3$ in the slurry. It is found that, at these low concentrations, the improvement in scrubbing capacity due to added sulfate is not substantial. Run 5 suggests that low sulfate concentration is detrimental when using relatively high $CaCO_3$ concentrations.

In runs 7 and 12, employing $Na_2SO_3$ as the soluble compound, 1% of the soluble salt is sufficient to show some improvement in the scrubbing capacity and this improvement is obtained regardless of the addition of other insoluble salts such as $CaSO_4$ and $CaSO_3$. However, runs 9 and 13 indicate that concentrations of $NA_2SO_3$ below 1% (e.g., 0.3%) provide no improvement whatever and that the additional presence of solid calcium sulfate and sulfite seems to provide a negative result.

Runs 20, 21, 24, 28 and 30 provide a comparison with higher concentrations of $Na_2SO_4$ in the scrubbing solution, i.e., 1 molal concentration. It is observed that an improvement of 55 to 80% in the utilization of $CaCO_3$ can be obtained with the higher concentration of $Na_2SO_4$ and this improvement is obtained in the presence or absence of insoluble sulfates or sulfites such as calcium sulfate or sulfite.

In runs 31 through 37 the experiments were conducted such that the scrubbing step could be run separately from the dissolving and precipitation steps. After equilibrating a slurry with a gas containing $CO_2$ the clear solution was obtained by filtration and 100 ml. were used in the scrubber. It was not the limestone utilization that was important in these runs but rather the dissolved scrubbing capacity of 100 ml. of solution. The improvement ratios for this set of experiments was calculated on changes in the dissolved scrubbing capacity compared to a control containing no sulfate and equilbrated with a gas containing 17% $CO_2$.

The high improvement ratios found in runs 32, 34, and 35 demonstrate the increase in dissolved scrubbing capacity caused by sulfate either in the presence or absence of other solids. Run 36 shows the increase in dissolved scrubbing capacity that could be achieved by raising the partial pressure of $CO_2$ to 1 atmohspere atmosphere the absence of soluble sulfate and run 37 shows the combined effects of increased $Co_2$ partial pressure and soluble sulfate.

TABLE 1

| Run | 1 | 2ª | 3 | 4 | 5 | 6 | 7 | 8 | 9 |
|---|---|---|---|---|---|---|---|---|---|
| Gas Flow—liters/min. | 1.0 | 1.1 | 1.1 | 1.1 | 1.1 | 1.0 | 1.0 | 1.0 | 1.0 |
| Vol. % $SO_2$ in Gas | .46 | .46 | .46 | .46 | .46 | .8 | .8 | .8 | .8 |
| SLURRY | | | | | | | | | |
| $CaCO_3$—grams (millimols) | .6 (6) | 1.0 (10) | 10. (100) | 1.0 (10) | 10. (100) | 2.0 (20) | 2.0 (20) | 0.6 (6) | 0.6 (6) |
| $CaSO_4.2H_2O$—grams | — | — | — | — | — | 4.0 | 4.0 | 1.2 | 1.2 |
| $CaSO_3.2H_2O$—grams | — | — | — | — | — | 4.0 | 4.0 | 1.2 | 1.2 |
| $Na_2SO_4$—grams (millimols) | — | — | — | 0.1 (0.7) | 1.0 (7.0) | — | — | — | — |
| $Na_2SO_3$—grams (millimols) | — | — | — | — | — | — | 1.0 (7.9) | — | 0.3 (2.4) |
| Gas Scrubbed—liters | 19.00 | 26.47 | 126.53 | 29.1 | 52.4 | 25.88 | 59.21 | 15.74 | 17.54 |
| Millimols $SO_2$/liter of gas | 0.188 | 0.188 | 0.188 | 0.188 | 0.188 | 0.326 | 0.326 | 0.326 | 0.326 |
| $SO_2$ Scrubbed—millimols | 3.57 | 4.99 | 23.8 | 5.46 | 9.85 | 8.45 | 19.3 | 5.14 | 5.72 |
| $SO_2$ leaked — " | 0.025 | 0.025 | 0.025 | 0.025 | 0.025 | 0.025 | 0.025 | 0.025 | 0.025 |
| $SO_2$ absorbed — " | 3.55 | 4.97 | 23.78 | 5.44 | 9.83 | 8.43 | 19.28 | 5.12 | 5.70 |
| Water Correction " | .55 | .55 | .55 | .55 | .55 | .55 | .55 | .55 | .55 |
| Solids*+Water Correction—millimols | — | — | — | — | — | 1.51 | 1.51 | 1.59 | 1.59 |
| Net $SO_2$ absorbed—millimols*** | 3.0 | 4.42 | 23.23 | 4.89 | 9.28 | 6.92 | 17.77 | 3.53 | 4.11 |
| Scrubbing Capacity of $CaCO_3$—% | 50 | 44.2 | 23.2 | 48.9 | 9.28 | 34.6 | 51.3 | 59.0 | 29.9 |

TABLE I—Continued

| Run | 1 | 2[a] | 3 | 4 | 5 | 6 | 7 | 8 | 9 |
|---|---|---|---|---|---|---|---|---|---|
| Improvement Ratio | — | — | — | 1.11 | — | 1.10 | 1.62 | 0.82 | 0.42 |

| Run | | 10[c] | 11[b] | 12 | 13 | 14 | 15 | 16 | 17[d] | 18 |
|---|---|---|---|---|---|---|---|---|---|---|
| Gas Flow—liters/min. | | 1.0 | 1.0 | 1.0 | 1.0 | 1.0 | 1.0 | 1.0 | 1.0 | 1.0 |
| Vol.% $SO_2$ in Gas | | .8 | .8 | .8 | .8 | .8 | .8 | .8 | .8 | .47 |
| SLURRY | | | | | | | | | | |
| $CaCO_3$—grams (millimols) | | 0.6 (6) | 2.0 (20) | 2.0 (20) | 0.6 (6) | 2.0 (20) | 2.0 (20) | 2.0 (20) | 2.0 (20) | 2.0 (20) |
| $CaSO_4 \cdot 2H_2O$—grams | | — | — | — | — | 4.0 | 4.0 | — | — | 4.0 |
| $CaSO_3 \cdot 2H_2O$—grams | | — | — | — | — | 4.0 | 4.0 | — | — | 4.0 |
| $Na_2SO_4$—grams (millimols) | | — | — | — | — | 1.0 (7) | — | 1.0 (7) | — | — |
| $Na_2SO_3$—grams (millimols) | | — | — | 1.0 7.9 | 0.3 (2.4) | — | — | — | — | — |
| Gas Scrubbed-liters | | 14.96 | 21.16 | 75.16 | 19.0 | 32.41 | 31.25 | 31.7 | 29.75 | 73.38 |
| Millimols $SO_2$/liter of gas | | 0.326 | 0.326 | 0.326 | 0.326 | 0.326 | 0.326 | 0.326 | 0.326 | 0.192 |
| $SO_2$ scrubbed—millimols | | 4.87 | 6.89 | 24.5 | 6.2 | 10.58 | 10.20 | 10.32 | 9.70 | 14.06 |
| $SO_2$ leaked — " | | 0.025 | 0.025 | 0.025 | 0.025 | 0.025 | 0.025 | 0.025 | 0.025 | 0.025 |
| $SO_2$ absorbed— " | | 4.85 | 6.87 | 24.48 | 6.18 | 10.56 | 10.18 | 10.30 | 9.68 | 14.04 |
| Water Correction " | | 0.55 | 0.55 | 0.55 | 0.55 | 0.55 | 0.55 | 0.55 | 0.55 | 0.46 |
| Solids*+Water Correction—millimols | | — | — | — | — | 1.55 | 1.55 | — | — | 1.77 |
| Net $SO_2$ absorbed—millimols*** | | 4.30 | 6.32 | 23.93 | 5.63 | 9.05 | 8.67 | 9.75 | 9.13 | 12.27 |
| Scrubbing Capacity of $CaCO_3$—% | | 71.1 | 31.6 | 65.5 | 52.1 | 45.3 | 43.4 | 48.7 | 45.6 | 61.5 |
| Improvement Ratio | | — | — | 1.44 | 0.73 | 0.99 | 0.95 | 1.07 | — | 1.37 |

| Run | 19[e] | 20 | 21 | 22 | 23[f] | 24 | 25[m] | 26[o] | 27[o] |
|---|---|---|---|---|---|---|---|---|---|
| Gas Flow—liters/min. | 1.0 | 1.0 | 1.0 | 1.0 | 1.0 | 1.0 | 1.0 | 1.09 | 1.09 |
| Vol.% $SO_2$ in Gas | .47 | .47 | .47 | .47 | .47 | .47 | .47 | .47 | .47 |
| Vol.% $CO_2$ in regenerator gas | | | | | | | | | ** |
| SLURRY | | | | | | | | | |
| $CaCO_3$—(Millimols) | 2.0 (20) | 2.0 (20) | 2.0 (20) | 2.0 (20) | 0.6 (6) | 0.6 (6) | — | 0.6 (6) | 0.6 (6) |
| $CaSO_4 \cdot 2H_2O$ — grams | — | — | 4.0 | — | — | — | — | — | — |
| $CaSO_3 \cdot 2H_2O$ — grams | — | — | 4.0 | — | — | — | — | — | — |
| $Na_2SO_4$—grams (millimols) | — | 14.0 (98.0) | 14.0 (98.0) | — | — | 14.0 (98.0) | 14.0 (98.0) | — | — |
| $Na_2SO_3$—grams (millimols) | — | — | — | — | — | — | — | — | — |
| Gas Scrubbed—liters | 49.23 | 85.34 | 100.27 | 69.95 | 34.23 | 55.0 | 5.6 | 30.0 | 30.9 |
| Millimols $SO_2$/liter of gas | 0.192 | 0.192 | 0.192 | 0.192 | 0.192 | 0.192 | 0.192 | 0.192 | 0.192 |
| $SO_2$ scrubbed — millimols | 9.47 | 16.36 | 19.26 | 13.42 | 6.58 | 10.52 | 1.06 | 5.80 | 5.92 |
| $SO_2$ leaked — " | 0.025 | 0.025 | 0.025 | 0.025 | 0.025 | 0.025 | 0.025 | 0.025 | 0.025 |
| $SO_2$ absorbed— " | 9.45 | 16.34 | 19.24 | 13.40 | 6.56 | 10.50 | 1.04 | 5.78 | 5.90 |
| Water Correction " | 0.46 | 1.04 | 1.04 | 0.46 | 0.46 | 1.04 | 1.04 | 0.46 | 0.46 |
| Solids*+Water Correction—millimols | — | — | 2.35 | — | — | — | — | — | — |
| Net $SO_2$ absorbed—millimols*** | 8.99 | 15.30 | 16.89 | 12.94 | 6.10 | 9.46 | 0 | 5.32 | 5.44 |
| Scrubbing Capacity of $CaCO_3$—% | 45.0 | 76.5 | 84.4 | 64.7 | 101.7 | 157.7 | — | 89.0 | 90.5 |
| Improvement Ratio | — | 1.70 | 1.88 | 1.44 | — | 1.55 | — | — | — |

| Run | 28 | 29[j] | 30 | 31 | 32 | 33[k] | 34 | 35 | 36 | 37 |
|---|---|---|---|---|---|---|---|---|---|---|
| Gas Flow—liters/min. | 1.09 | 1.09 | 1.09 | 1.09 | 1.09 | 1.09 | 1.09 | 1.09 | 1.09 | 1.09 |
| Vol.% $SO_2$ in Gas | 0.47 | 0.47 | 0.47 | 0.47 | 0.47 | 0.47 | 0.47 | 0.47 | 0.47 | 0.47 |
| Vol.% $CO_2$ in regen. gas | ** | ** | ** | 17 | 17 | 17 | 17 | 17 | 100 | 100 |
| SLURRY | | | | | | | | | | |
| $CaCO_3$—grams (millimols) | 0.6 (6) | 2.0 (20) | 2.0 (20) | 2.0 (20) | 2.0 (20) | 2.0 (20) | 2.0 (20) | 2.0 (20) | 2.0 (20) | 2.0 (20) |
| $CaSO_4 \cdot 2H_2O$ — grams | — | — | — | 4.0 | 4.0 | — | — | — | — | — |
| $CaSO_3 \cdot 2H_2O$ — grams | — | — | — | 4.0 | 4.0 | — | — | — | — | — |
| $Na_2SO_4$—grams (Millimols) | 14.0 (98.0) | — | 14.0 (98.0) | — | 14.0 (98.0) | — | 14.0 (98.0) | 14.0 (98.0) | — | 14.0 (98.0) |
| $Na_2SO_3$—grams (millimols) | — | — | — | — | — | — | — | — | — | — |
| Gas Scrubbed—liters | 49.8 | 45.96 | 83.49 | 5.11 | 22.0 | 6.03 | 17.28 | 18.3 | 11.8 | 32.0 |
| Millimols $SO_2$/liter of gas | 0.192 | 0.192 | 0.192 | 0.192 | 0.192 | 0.192 | 0.192 | 0.192 | 0.192 | 0.192 |
| $SO_2$ scrubbed—millimols | 9.55 | 8.81 | 16.05 | 0.98 | 4.22 | 1.16 | 3.32 | 3.51 | 2.27 | 6.15 |
| $SO_2$ leaked — " | 0.025 | 0.025 | 0.025 | 0.025 | 0.025 | 0.025 | 0.025 | 0.025 | 0.025 | 0.025 |
| $SO_2$ absorbed — " | 9.53 | 8.79 | 16.03 | 0.96 | 4.20 | 1.14 | 3.30 | 3.48 | 2.25 | 6.13 |
| Water Correction " | 1.04 | 0.46 | 1.04 | 0.46 | 1.04 | 0.46 | 1.04 | 1.04 | 0.46 | 1.04 |
| Solids*+Water Correction—millimols | — | — | — | — | — | — | — | — | — | — |
| Net $SO_2$ absorbed—millimols *** | 8.49 | 8.33 | 15.0 | 0.50 | 3.16 | 0.68 | 2.26 | 2.44 | 1.79 | 5.09 |
| Scrubbing Capacity of $CaCO_3$—% | 141.0 | 41.6 | 75.0 | | | | —employed clear solution— | | | |
| Improvement Ratio | 1.57 | — | 1.80 | 0.74 | 4.65 | — | 3.32 | 3.59 | 2.62 | 7.50 |

*solids other than $CaCO_3$;
**not measured;
***by components other than water

[a] Control for Run 1-5;
[b] Control for Run 6 and 7;
[c] Control for Run 8, 9, and 13;
[d] Control for Run 12, 14, 15, and 16;
[e] Control for Run 18, 20, 21, and 22;
[f] Control for Run 24;
[g] The average of runs 26 and 27 is the control for Run 28;
[j] Control for Run 30;
[k] Control for Run 31, 32, 34, 35, 36 and 37;
[m] Blank run on the scrubbing capacity of an aqueous 14% solution of $Na_2SO_4$ in the absence of other components.

In an illustrative embodiment of the present invention about 100 volumes of an aqueous slurry containing about 10 weigh percent solids, 6 weight percent MgO, 4 weight percent $CaSO_4$ and $CaSO_3$ is introduced into the upper portion of a glass tube. The simulated waste gas of Example 1 containing 0.47% $SO_2$ is introduced into the bottom of the tube and is passed upwardly through the slurry at a rate of 1 liter/minute at a temperature of 25°C under atmospheric pressure until the MgO is converted to $MgSO_4$ by the action of $SO_2$ and $O_2$ in the gas; whereupon 1 weight percent of $CaCO_3$ is added to the slurry. After 1 hour of operation waste gas in withdrawn from the top of the glass tube. The waste gas contains less than 10 ppm $SO_2$ and $SO_3$. Accordingly, more than 99.7% of the oxides of sulfur is absorbed in the slurry. The improvement ratio of calcium carbonate utilization in this slurry over the standard aqueous limestone, $CaSO_4$, $CaSO_3$ slurry, as described in Example 1, run 19, is 2.0.

In another illustrative embodiment of the present invention, about 100 volumes of an aqueous slurry containing about 6 weight percent solids, 15 weight percent $NH_3$, 6 weight percent $CaSO_4$ and $CaSO_3$, is introduced into the upper portion of a glass tube. The simulated waste gas of Example 1 is introduced into the bottom of the tube and is passed upwardly through the slurry at a rate of 1 liter/minute at a temperature of 25°C under atmospheric pressure until $(NH_4)_2SO_4$ is formed; whereupon 1 weight percent $CaSO_3$ is added to the slurry. After 2 hours of operation waste gas is withdrawn from the top of the glass tube. The waste gas contains less than 10 ppm $SO_2$ and $SO_3$. Accordingly, more than 99.7% of the oxides of sulfur is absorbed in the slurry. The improvement ratio of calcium carbonate utilization in this slurry over the standard aguenous limestone, $CaSO_4$, $CaSO_3$ slurry, as described in Example 1, run 19, is 2.2.

In an additional illustrative embodiment of the present invention, about 100 volumes of an aqueous slurry containing about 7 weight percent solids, 20 weight percent KOH, 7 weight percent $CaSO_4$ and $CaSO_3$ is introduced into the upper portion of a glass tube. The simulated waste gas of Example 1 is introduced into the bottom of the tube and is passed upwardly through the slurry at a rate of 1 liter/minute at a temperature of 25°C under atmospheric pressure until $K_2SO_4$ is formed from KOH; whereupon 1 weight percent $CaCO_3$ in the form of limestone is added to the slurry. After 1 hour of operation waste gas is withdrawn from the top of the glass tube. The waste gas contains less than 10 ppm $SO_2$ and $SO_3$. Accordingly, more than 99.7% of the oxides of sulfur is absorbed in the slurry. The improvement ratio of calcium carbonate utilization in this slurry over the standard aqueous limestone, $CaSO_4$, $CaSO_3$ slurry, as described in Example 1, run 19, is 2.0.

In an additional illustrative embodiment of the present invention, about 100 volumes of an aqueous slurry containing about 6 weight percent solids, 25 weight percent of $(NH_4)_2CO_3$, 6 weight percent of a $CaSO_4$ and $CaSO_3$ is introduced into the upper portion of a glass tube. The simulated waste gas of Example 1 is introduced into the bottom of the tube and is passed upwardly through the slurry at a rate of 2 liters/minute at a temperature of 35°C under a pressure of 5 psig. until the $(NH_4)_2CO_3$ is converted to $(NH_4)_2SO_4$; whereupon 1 weight percent $CaCO_3$ is added to the slurry. After 0.5 hour of operation waste gas is withdrawn from the top of the glass tube. The waste gas contains less than 10 ppm $SO_2$ and $SO_3$. Accordingly, more than 99.7% of the oxides of sulfur is absorbed in the slurry. The improvement ratio of calcium carbonate utilization in this slurry over the standard aqueous limestone, $CaSO_4$, $CaSO_3$ slurry, as described in Example 1, run 19 is 2.2.

The scrubbing liquids of each of the foregoing embodiments can be treated for regeneration of soluble sulfate and recovery of sulfur values as calcium sulfate and calcium sulfite in the manner set forth above in the description of the drawing.

EXAMPLE 2

This example illustrates the comparative $SO_2$ removal efficiencies of limestone slurry systems promoted respectively with magnesium sulfate, sodium sulfate, and ammonium sulfate as compared with unpromoted limestone slurry systems when such systems are utilized in a Venturi-type scrubber.

Test runs summarized in Table II were made in an unsteady-state condition by passing 1,000 SCFM of simulated waste gas having the constant volume composition of 15% carbon dioxide, 0.2 to 0.3 percent sulfur dioxide, and balance air through an 8-inch Venturi-type scrubber in co-current contact with an initially fixed composition limestone aqueous slurry system. The solids component of the slurry systems was calcium carbonate, calcium sulfate, and calcium sulfite. Since the solids composition was fixed at the beginning of each run without subsequent additions or removals, ratios of the aforementioned solids as well as solution characteristics of the slurry changed during the duration of each run. Each of the runs utilizing promoted slurries was terminated when the percent removal of sulfur dioxide decreased sharply. Runs 1 and 2 utilizing unpromoted limestone slurries, were terminated arbitrarily since percent sulfur dioxide removal remained at a relatively constant low level.

An agitated slurry tank was used to receive scrubber effluent and to serve as a pump tank for recirculation of the slurry to the scrubber. Slurry temperatures were maintained in the range of from about 125°F to about 135°F.

Prior to the test runs summarized in Table II, simulated waste gas was scrubbed in the equipment described with an aqueous sodium carbonate solution which has a high potential for absorbing sulfur dioxide and essentially zero sulfur dioxide back pressure. Accordingly, it was found that the mass transfer limit of the scrubber under these operating conditions was about 70%. Thus, the percent sulfur dioxide removal data summarized in Table II can be considered against the background of this limitation.

The data presented in Table II illustrates that the percent sulfur dioxide removal from simulated waste gas is significantly increased by scrubbing such gas with promoted limestone slurries that are representative of the present invention as compared with unpromoted limestone slurries.

TABLE II

| Promoter | none | | $MgSO_4$ | | | $Na_2SO_4$ | | | $(NH_4)_2SO_4$ | |
|---|---|---|---|---|---|---|---|---|---|---|
| Run | 1 | 2 | 3 | 4 | 5 | 6 | 7 | 8 | 9 | 10 | 11 |
| Slurry Rate, gpm. | 20 | 30 | 33 | 33 | 33 | 33 | 33 | 33 | 33 | 33 | 33 |
| Promoter Concentration, | — | — | 11.2 | 24.8 | 15.2 | 13.4 | 13.0 | 12.5 | 13.3 | 13.3 | 27.0 |

TABLE II—Continued

| Promoter | none | | | MgSO$_4$ | | | Na$_2$SO$_4$ | | | (NH$_4$)$_2$SO$_4$ | |
|---|---|---|---|---|---|---|---|---|---|---|---|
| Run | 1 | 2 | 3 | 4 | 5 | 6 | 7 | 8 | 9 | 10 | 11 |
| wt. percent | | | | | | | | | | | |
| pH Venturi, initial | 5.3 | 6.2 | 5.9 | 5.1 | 5.4 | 6.3 | 6.1 | 6.3 | 6.6 | 5.8 | 6.5 |
| final | 5.0 | 5.4 | 4.9 | 4.4 | 4.6 | 5.4 | 5.3 | 6.2 | 4.9 | 4.8 | 4.8 |
| Run length, hours | 6.5 | 5.0 | 13.7 | 9.5 | 6.0 | 7.2 | 7.8 | 4.0 | 6.5 | 7.0 | 8.7 |
| Initial Wt. percent solids | 5.0[b] | 5.4 | 10.2 | 5.0 | 9.6 | 7.8 | 10.0 | 14.8 | 5.5 | 13.5[b] | 10.5[b] |
| Initial Wt. percent CaCO$_3$ in solids | 94.9 | 68.6 | 48.3 | 94.9 | 68.5 | 56.1 | 37.4 | 30.4 | 94.4 | >23.0 | 30.8[b] |
| % SO$_2$ Removal, max.[a] | 27.3 | 26.8 | 67.7 | 55.9 | 59.0 | 51.9 | 49.7 | 53.9 | 66.7 | 63.4 | 71.8 |
| Wt. percent solids at max. SO$_2$ removal | 5.0[b] | 4.3 | 10.3 | 4.8 | 7.2 | 7.6 | 10.9[b] | 14.4[b] | 5.4 | 12.5 | 9.8 |
| Wt. percent CaCO$_3$ in solids at max. SO$_2$ removal | 89.3 | 59.6 | 22.2[b] | 61.8 | 64.9 | 31.6 | 19.6[b] | 28.7[b] | 87.7 | 23.0 | 27.7 |

[a] Based on hourly sampling period
[b] Interpolated

Many modifications and variations of this process will become apparent from the above disclosure without departing from the scope of this invention.

Having thus described our invention, we claim:

1. A process for removing sulfur dioxide from industrial waste gas which comprises:
   scrubbing waste gas in a contacting zone with an aqueous medium having a pH below 7.1 containing clacium carbonate, carbon dioxide and at least about 3 weight percent of a soluble sulfate selected from the group consisting of sodium, lithium, potassium, magnesium, and ammonium sulfates;
   precipitating solids selected from the group consisting of calcium sulfite and calcium sulfate from the aqueous medium;
   removing a portion of said solids; and
   introducing a remaining portion of the solids with said aqueous medium to the contacting zone.

2. The process of claim 1 wherein gas-liquid contact time in said contacting zone is less than 3 seconds.

3. The process of claim 2 wherein said contacting zone is a venturi scrubber.

4. The process of claim 2 wherein said soluble sulfate in the aqueous medium is present in the range from about 5 weight percent to about 27 weight percent.

5. The process of claim 1 wherein said soluble sulfate is generated in the aqueous medium by the addition of ammonia or the oxide, hydroxide, carbonate, bicarbonate, sulfite or bisulfite of sodium, lithium, potassium, magnesium or ammonia or mixtures thereof.

6. The process of claim 4 wherein temperature of the contacting zone is from about 100°F to about 180°F and the pressure is from about 12 psia. to about 18 psia.

7. The process of claim 1 wherein at least part of the aqueous medium is recovered as an aqueous supernatent containing at least about 3 weight percent of a soluble sulfate selected from the group consisting of sodium, lithium, potassium, magnesium, and ammonium sulfates and said aqueous supernatent is separately introduced to the contacting zone.

8. The process of claim 4 wherein at least 5 weight percent of the solids introduced to the contacting zone with said aqueous medium are calcium carbonate and said calcium carbonate is added to the aqueous medium as limestone or dolomite.

9. The process of claim 2 wherein the waste gas contains oxygen, carbon dioxide and from about 0.01 weight percent to about 5 weight percent sulfur dioxide.

10. A process for removing sulfur dioxide from industrial waste gas which comprises:
    scrubbing waste gas containing from about 0.01 weight percent to about 5 weight percent sulfur dioxide in a contacting zone wherein gas-liquid contact time is less than 5 seconds with an aqueous medium having a pH below 7.1 containing calcium carbonate, carbon dioxide, and from about 5 weight percent to about 27 weight percent of magnesium sulfate
    precipitating as solids, calcium sulfite and calcium sulfate from the aqueous medium;
    removing a portion of said solids;
    introducing a remaining portion of the solids with said aqueous medium to the contacting zone, said solids containing at least 5 weight percent calcium carbonate based on total solids;
    recovering at least part of the aqueous medium as an aqueous supernatent containing at least about 5 weight percent of magnesium sulfate; and
    introducing said aqueous supernatent separately to the contacting zone.

* * * * *